United States Patent [19]

Kobayashi

[11] Patent Number: 4,991,013
[45] Date of Patent: Feb. 5, 1991

[54] PICTURE-IN-PICTURE TELEVISION APPARATUS WITH SYNC CONTROLLED MEMORY ADDRESSING

[75] Inventor: Jun Kobayashi, Katsuta, Japan
[73] Assignee: Hitachi, Ltd., Tokyo, Japan
[21] Appl. No.: 336,804
[22] Filed: Apr. 13, 1989

[30] Foreign Application Priority Data

Apr. 15, 1988 [JP] Japan .................................. 63-91417

[51] Int. Cl.⁵ ............................................. H04N 5/45
[52] U.S. Cl. ...................................... 358/183; 358/22
[58] Field of Search ........................... 358/183, 22, 166

[56] References Cited

U.S. PATENT DOCUMENTS

| | | | |
|---|---|---|---|
| 4,249,213 | 2/1981 | Imaide et al. | 358/183 |
| 4,712,130 | 12/1987 | Casey | 358/183 X |
| 4,722,007 | 1/1988 | Fling | 358/183 |
| 4,724,487 | 2/1988 | Casey | 358/22 X |
| 4,748,504 | 5/1988 | Ikeda et al. | 358/183 X |
| 4,809,069 | 2/1989 | Meyer et al. | 358/166 |
| 4,816,915 | 3/1989 | Imai et al. | 358/183 |
| 4,855,833 | 8/1989 | Kageyama et al. | 358/183 |

Primary Examiner—James J. Groody
Assistant Examiner—Mark R. Powell
Attorney, Agent, or Firm—Antonelli, Terry, Stout & Kraus

[57] ABSTRACT

An apparatus for processing video signals to produce a combined picture video signal from which a large picture and one or more small pictures being inset in the large picture are simultaneously reproduced on a display screen. Video signals providing image information for small pictures are stored in a memory mainly on the basis of a storage control signal produced from a result of a phase comparison between a reference signal and a vertical sync signal separated from each of the video signals providing image information for small pictures. The reference signal has pulses recurrent with a period twice the repetition period of pulses of the vertical sync signal in the video signal or identical with the repetition period of pulses of a horizontal sync signal in the video signal, and assumes a relatively high level and a relatively low level alternately with a duty factor of 50%.

6 Claims, 12 Drawing Sheets

PICTURE-IN-PICTURE TELEVISION APPARATUS WITH SYNC CONTROLLED MEMORY ADDRESSING

BACKGROUND OF THE INVENTION

The present invention relates to an image processing apparatus and more particularly to a memory control means which is suitable to simultaneously display a large picture and small pictures inset in the large picture which are provided by processing an input video signal in a reduction and division manner using a digital technique such as a memory.

Conventionally, there have been proposed systems for simultaneously displaying a plurality of pictures by reducing a picture image through digital processing. This technique has been applied to a magnetic recording/reproducing device. For example, this technique has been implemented for functions such as the viewing a TV broadcasting program while reproducing a video tape on the same display screen, a multi-picture screen (or picture-in-picture screen) in which a plurality of TV broadcasting programs are displayed on a single display screen, etc.

As an example of the conventional systems, the picture-in-picture technique in TV broadcasting reception is disclosed in U.S. Pat. No. 4,249,213, issued to Imaide et al on Feb. 3, 1981, and assigned to the assignee of the present invention. The technique disclosed in this reference is to combine two pictures using a memory. More specifically, by setting the period of the memory read shorter than that of the memory write to reduce the image, or controlling the read timings, two asynchronous video signals are aligned in their time base. Thus, a reduced picture, referred to as a small picture, can be inset in a portion of a picture, referred to as a large picture, displayed on the entire screen of a picture tube.

The above proposed technique is to inset one small picture in a large picture. By increasing the number of small pictures to 2, 3, . . . , many pictures can be simultaneously viewed on the same screen. However, only arranging in parallel the systems including tuners in order to increase the number of small pictures gives rise to a remarkable increase in the production cost. Additionally, there is proposed a technique of using a tuner, an A/D converter, etc. as a single system so that they are time-divisionally changed over. This technique, however, provides the problem of fluctuations of small pictures in the vertical direction. This is because one frame of a video signal in the NTSC System is constituted by two fields, i.e., ODD- and EVEN-numbered fields, and mere use of the above time-division change-over may cause vertical shifts of the entire small images owing to a difference of 0.5 H (½ of the horizontal scanning period) between the odd- and even-numbered fields.

SUMMARY OF THE INVENTION

An object of the present invention is to provide an apparatus which produces a signal for controlling storage in a memory of video signals from different display signal sources in the order defined by a switching signal for switching the display signal sources.

Another object of the present invention is to provide an image signal processing apparatus for producing a combined picture video signal from which a large picture and at least one small picture inset in the large picture are simultaneously reproduced on a display screen.

Still another object of the present invention is to provide a system which permits a plurality of small pictures to be viewed without fluctuation using the time-division technique.

In accordance with one aspect of the present invention, there is provided means for generating a reference signal having pulses recurrent with a period twice the repetition period of pulses of a vertical sync signal or identical with the repetition period of pulses of a horizontal sync signal and assuming a relatively high level and a relatively low level alternately with a duty factor of 50%, and this reference signal is compared with the vertical sync signal of a video signal produced by a display signal source such as a tuner thereby to always store the same field (ODD or EVEN) in a memory.

In one embodiment of the present invention, the reference signal generating means generates a reference signal having a period identical with that of the sync signal of a video signal by frequency dividing a reference clock from a quartz oscillator, etc. A phase difference between this reference signal and the sync signal included in a video signal broadcast by a TV station and received by a tuner gradually changes, since the period of the sync signal included in the video signal is a little bit longer or shorter than the prescribed period in many cases. Thus, when a receiving channel is interrupted due to a change-over between channels in the tuner, the phase relation between the video signal and the reference signal will not vary while the video signal ceases. Therefore, if the field of the video signal to be stored is defined or specified using the phase of the reference signal as a reference phase, the same odd-numbered or even-numbered field can always be stored in a memory even if the tuner is time-divisionally used.

Further, generally, the field discrimination circuit discriminates the field by taking the average of several fields for the purpose of preventing malfunctions thereof so that when the tuner is changed-over for channel selection, it takes rather a long time to discriminate the field. Thus, in another embodiment of the present invention, a plurality of field discrimination circuits are provided so as to be allotted to the respective channels and the averaging processing in the non-selected discrimination is suspended as it is. In this way, even if the channel of the tuner is changed over, it does not take a long time to discriminate the field, thus permitting the tuner to be time-divisionally used.

DESCRIPTION OF THE PREFERRED EMBODIMENTS

Figure 1:
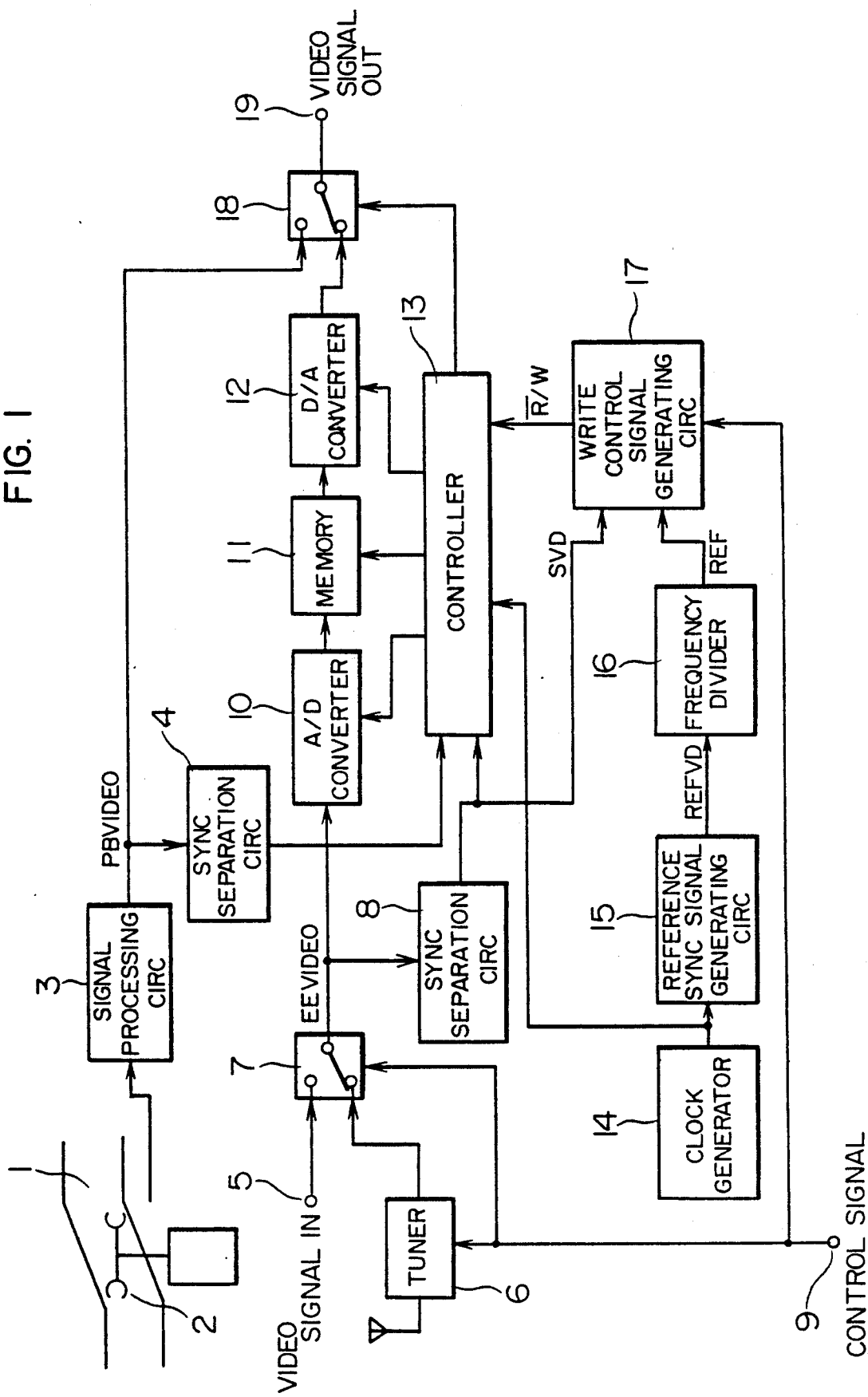
FIG. 1 is a block diagram of one embodiment of the present invention.

FIG. 1 is a block diagram of one embodiment of the present invention. In FIG. 1, 1 denotes a magnetic tape; 2 magnetic heads; 3 a signal processing circuit; 4, 8 sync separation circuits; 5 a video signal input terminal; 6 a tuner; 7 and 18 video signal change-over switches; 9 a terminal to which a control signal (switching control signal) for channel selection, timing setting, etc. is inputted; 10 an A/D converter; 11 a memory (e.g. DRAM); 12 a D/A converter; 13 a control circuit which can be constructed by a logic circuit; 14 a clock generator; 15 a reference sync signal generating circuit; 16 a ½ frequency divider; 17 a write control signal generating circuit; and 19 a video signal output terminal.

Explanation will be given on the operation of the system shown in FIG. 1. The magnetic tape 1 is traced by the magnetic heads 2 to pick up a signal recorded on the magnetic tape 1. The signal is processed by the signal processing circuit 3 to provide a reproduced video signal PBVIDEO. On the other hand, a video signal input to the video input terminal 5 from an external device (e.g. video disk device, VTR, etc.) and a TV video signal are fed to input terminals of the video signal change-over switch 7, which is controlled by the control signal (switching control signal) supplied to the terminal 9 from, e.g., a microprocessor (not shown) to provide an external video signal EEVIDEO. Sync signals of the respective video signals PBVIDEO and EEVIDEO are separated from the video signals in the sync separation circuits 4 and 8 to be sent to the control circuit 13. The control circuit 13 controls the A/D converter 10, the memory 11, the D/A converter 12 and the switch 18 to carry out image reduction and time base alignment.

This will be more specifically explained. The external video signal EEVIDEO is converted into a digital signal in the A/D converter 10 with a first clock signal which is generated by the control circuit 13 in synchronism with the horizontal sync signal separated by the sync separation circuit 8 and the digital video signal is stored in the memory 11. The storage is performed at a predetermined address on the basis of the sync signal of the external video signal EEVIDEO in a predetermined first cycle period ($\overline{R/W}$). The read-out from the memory 11 is performed in synchronism with the sync signal of the reproduced video signal in a predetermined second cycle period which is shorter than the first cycle period. The video data thus read is converted into an analog signal in the D/A converter 12 by using a second clock signal which is generated by the control circuit 13 in synchronism with another horizontal sync signal separated by the sync separation circuit 4. Thus, the reduced pictures in synchronism with the reproduced video signal PBVIDEO are provided. In this case, the number of the reduced pictures, the arrangement thereof, etc., are determined by the manner of allotting memory addresses and the positions of the reduced pictures are determined by a phase relation of the video data with respect to the vertical and horizontal sync signals obtained in the sync separation circuit 4. The reduction scale is decided in accordance with the ratio of the storage (first) cycle period to the read (second) cycle period. The video signal change-over switch 18 serves to inset the small (reduced) pictures on the large picture. More specifically, while the video signal data is read out from the memory 11 and the D/A converter 12 outputs the reduced video signal, the switch 18 is connected with the D/A converter 18 side. Then, the small pictures are inset in the reproduced image signal PBVIDEO. This combined video signal is outputted from the video output terminal 19 and displayed on a display screen.

Figure 2:
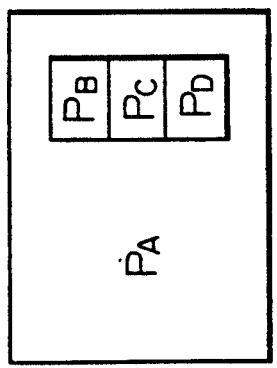
FIG. 2 is a view of one example of an output image in the one embodiment of the present invention.

FIG. 2 shows an example of the picture arrangement formed through the process mentioned above. An area $P_A$ is an image reproduced from the magnetic tape 1. Areas $P_B$, $P_C$ and $P_D$ are images of the digitally processed small pictures. The address space of the memory is divided into three regions to display three images. These three images may be images from three TV channels or from two TV channels and a VTR. The data rewrite in the respective areas is carried out using an address signal formed by the control circuit 13 on the basis of the control signal input to the terminal 9. In this case, the data rewrite in the memory 11 is carried out in synchronism with the channel selection (or channel change-over) in the tuner 6 or the change-over in the video signal change-over switch 7 so that images from external devices or different broadcasting stations can be optionally allotted to the areas $P_B$, $P_C$ and $P_D$.

When the change-over in the tuner 6 or in the video signal change-over switch is performed, the video signal may be disordered. This can be masked by adjusting the data rewrite timing in the memory 11. More specifically, after the video signal has been changed over, only one field when the video signal is stabilized is rewritten. Thereafter, the video signal is changed over again. If such an operation is performed swiftly, the pictures of the areas $P_B$, $P_C$ and $P_D$ look like moving pictures although the movement thereof is not smooth. Thus, by sequentially rewriting the memory in a time-division manner for the purpose of displaying a moving picture or an image from another display signal source, many images can be simultaneously displayed at low cost.

Through the operation mentioned above, a plurality of images are divisionally displayed. In this case, the memory 11 must be always rewritten for the video signal in the same odd- or even-numbered field. The reason therefor is as follows. The video signal is constituted by two fields, ODD- and EVEN-numbered fields, i.e., because of interlace scanning, and so the scanning lines in one field deviate by 0.5 H from those in another field in the vertical direction so that the scanning lines of the former are inserted between the respective scanning lines of the latter. Therefore, unless the field is suitably selected to rewrite the memory 11, the images of the small pictures look as if they fluctuate in the vertical direction.

In order to prevent this, it is necessary to discriminate the fields of an input video signal. However, the field discrimination can not be inconveniently performed at a high speed. More specifically, although the fields can be discriminated from the phase relation between a vertical sync signal and a horizontal sync signal, the video signal carried on a radio wave, which includes disturbance such as noise, is generally subject to averaging processing for the purpose of preventing erroneous discrimination. For example, there is proposed a scheme in which only when the discrimination result continues to be inverted during successive several fields, the discrimination output is changed over and so immediate response to disturbance such as noise does not occur. However, this scheme can not permit the high speed time-divisional processing. In order to overcome such an inconvenience, in this embodiment, the memory 11 is adapted to be always rewritten for the same odd-numbered or even-numbered fields, without the field discrimination through phase comparison between the vertical sync signal and the horizontal sync signal.

A system for implementing this will now be explained.

The reference sync signal generating circuit 15 generates a reference sync signal REFVD having a period identical with that of the sync signal of a video signal defined by a certain standard (e.g., NTSC standard); this is performed by frequency-dividing a reference clock produced from the clock generator 14. The clock generator 14, which is a quartz oscillator, can generates clocks having a very precise frequency. Therefore, the period of the reference sync signal REFVD is also precise. When this reference sync signal REFVD is viewed simultaneously with the video signal sent from external device or a broadcasting station, the relation between the phases of both signals varies very slowly and so looks as if it was fixed. Thus, even if the video signal at a certain channel is momentarily interrupted due to high speed change-over in the tuner, if the tuning is made again, the phase relation between the video signal and the reference sync signal REFVD remains almost unchanged in the previous state. Then, this fact is used to always rewrite the memory 11 for the same field. More specifically, it is possible to continue to write the video signal belonging to the same field in the memory in such a manner that: the reference sync signal REFVD is reduced to ½ in its frequency through the ½ frequency divider 16 to provide a reference signal REF which repeats states of H and L for each field; this reference signal is sampled in the write control circuit 17 using the vertical sync signal SVD separated from the external video signal EEVIDEO in the sync separation circuit 8 (in other words, phase comparison between the signal REF and the signal SVD is made to select pulses in the signal SVD with which pulses the signal REF always assumes a high level or a low level); and then write enable pulses which rise with the sampling pulses (or the selected pulses) and last for a duration identical with the field period are generated.

Figure 3:
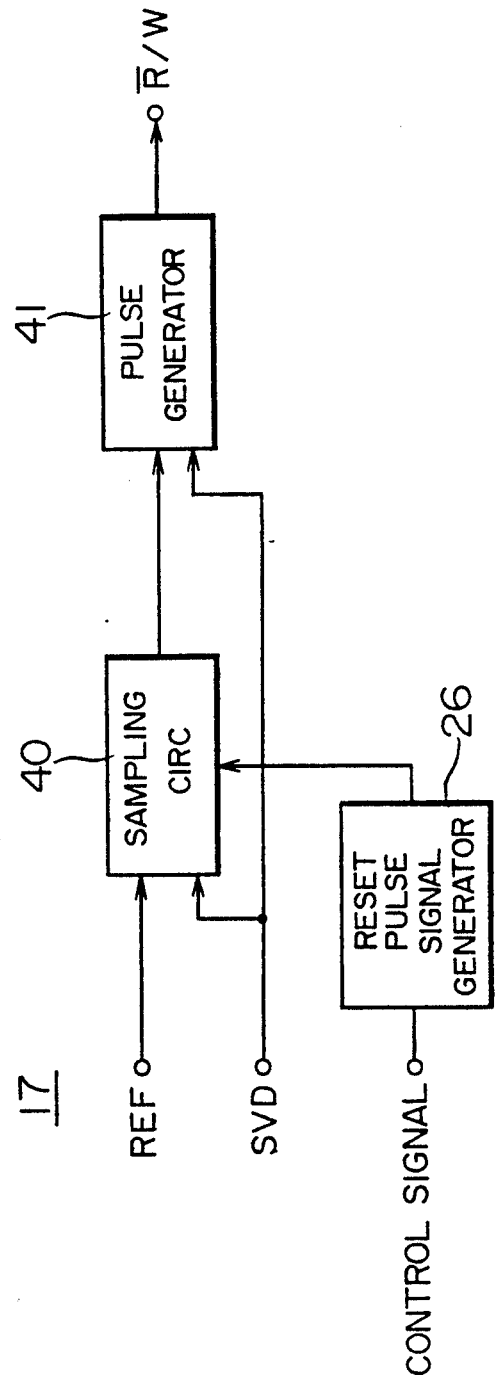
FIG. 3 is a block diagram of the present invention.

FIG. 3 is a block diagram of an exemplary arrangement of the write control circuit 17. In FIG. 3, a reset pulse signal generator circuit 26 generates reset pulses in response to input of a control signal. The reset pulses serve to reset a sampling circuit 40 whereby the write operation for the memory 11 is permitted. The sampling circuit 40, which samples the REF signal using the SVD signal, produces a signal which is high with an initial SVD input pulse during the High (H) duration of the REF signal after having been reset. The pulse generator 41 picks up an initial one field period from the output signal of the circuit 40 as a write enable signal (R̄/W). Thus, the write signal generated after the control signal has been applied is always the signal belonging to the same field.

Figure 4A:
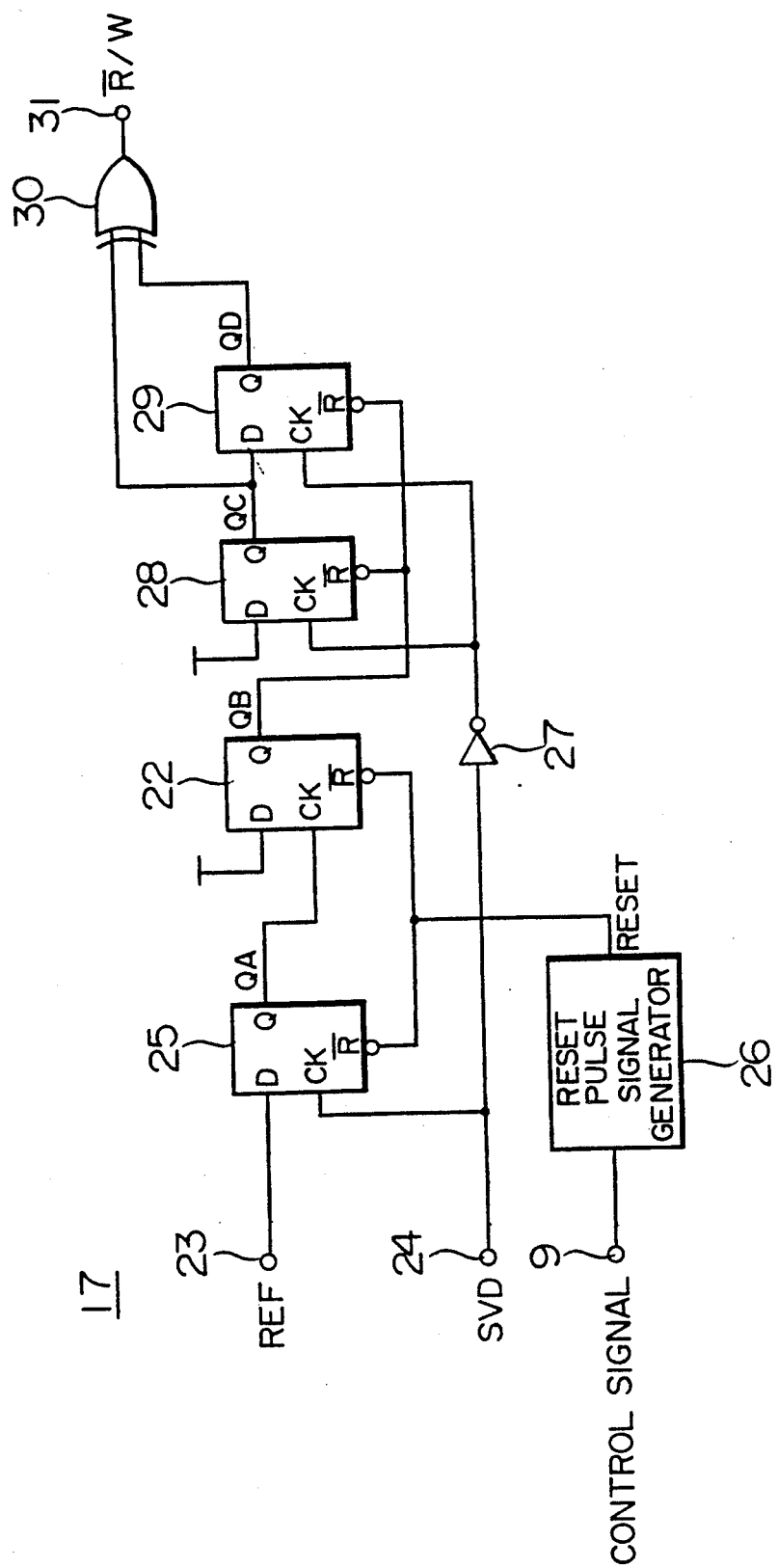
FIG. 4A is a diagram of one example of a specific circuit in the embodiment of FIG. 3.
Figure 4B:
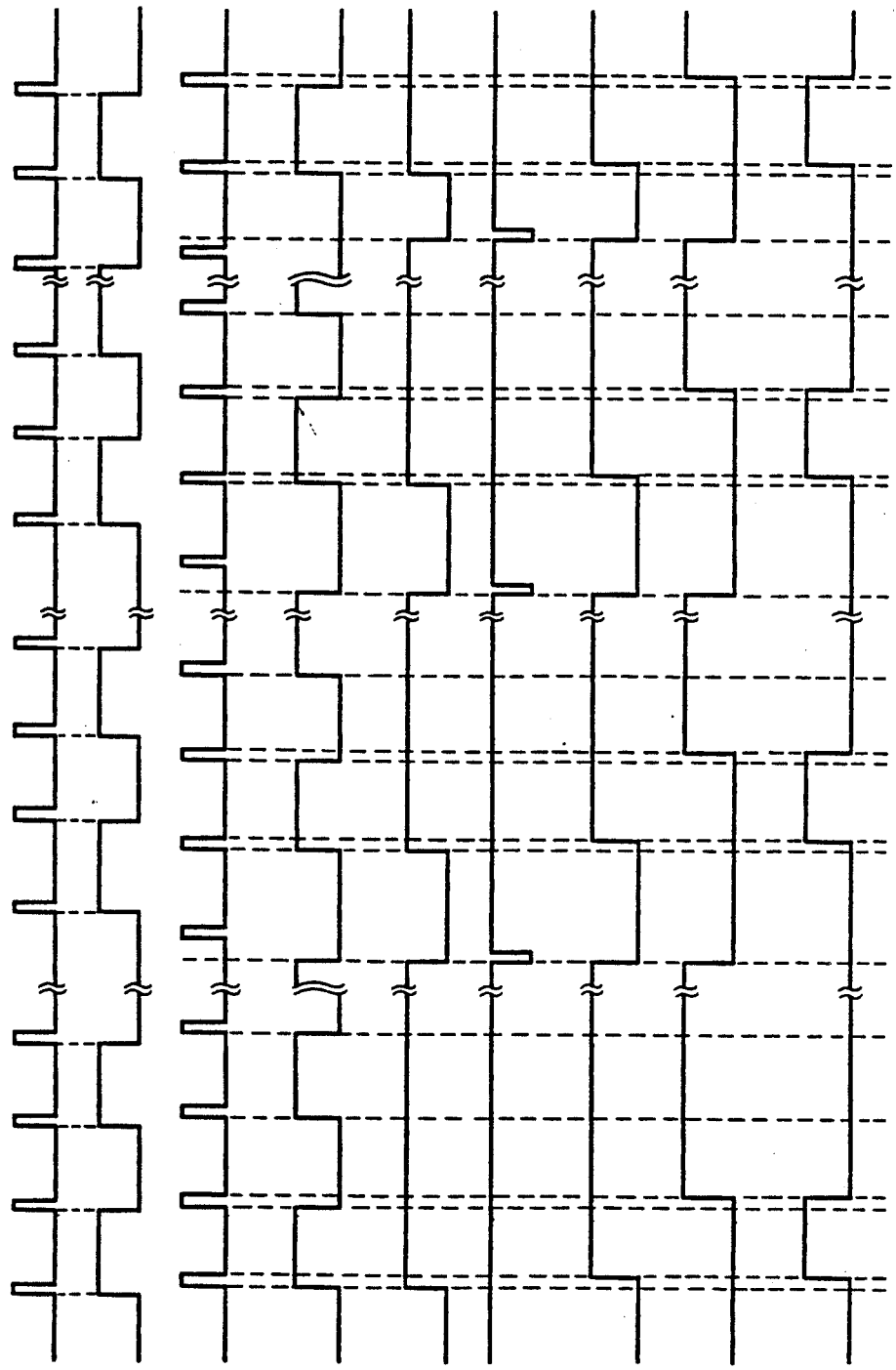
FIG. 4B is a timing chart showing the operation of the embodiment of FIG. 3.
Figure 9:
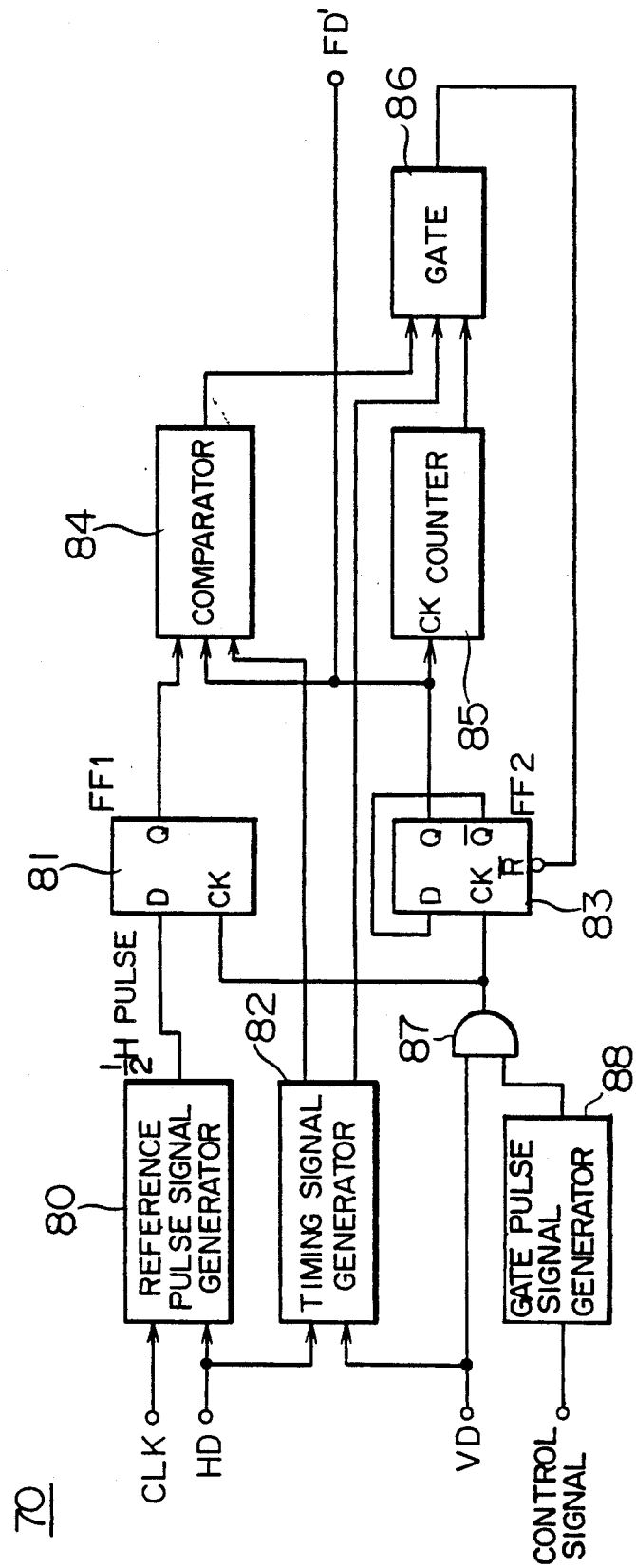
FIG. 9 is a block diagram of yet another embodiment of the present invention.

An example of the write control circuit 17 is shown in FIG. 4A, and a timing chart of the operation in the circuit is shown in FIG. 4B. In FIG. 4A, 9 denotes a control signal input terminal; 23 a reference signal input terminal; 24 a vertical sync signal input terminal; 25, 22, 28, 29 flip-flops; 26 a reset pulse generator circuit; 27 an inverter; 30 an exclusive OR circuit; and 31 a write enable signal (R̄/W) output terminal.

The operation in the circuit of FIG. 4A will be explained below. The reference signal REF which is provided by reducing the frequency of the reference sync signal REFVD is applied to the input terminal 23. The control signal for controlling the change-over in the tuner, the input video signal change-over, etc. is applied to the input terminal 9 and sent to the reset pulse generator 26. The reset pulse generator 26 generates reset pulses RESET at the timings for changing over the control signal to reset the flip-flops 25 and 22 whereby the Q output QB of the flip-flop 22 becomes "High". Thus, the flip-flops 28 and 29 are also reset. If the vertical sync signal SVD is applied to the CK input terminal of the flip-flop 25 during the time when the reference signal REF at the High level is inputted to the D input terminal of the flip-flop 25, the Q output (QA) becomes "High" with the rising edge of the SVD signal and so the Q output (QB) of the flip-flop 22 also becomes "High". Thus, the reset state of the flip-flops 28 and 29 is canceled. Then, an inverted signal of the vertical sync signal SVD has been inputted to the CK input terminal so that the Q outputs (QC and QD) of the flip-flops 28 and 29 sequentially become "High". The Q outputs (QC and QD) of the flip-flops 28 and 29 are inputted to the exclusive OR circuit 30 so that a write-enable signal or write instruction signal (R̄/W) having a duration of one field is outputted from the output terminal 31. As mentioned above, the phase relation between the reference signal REF and the vertical sync signal SVD varies very slowly so that the write instruction is always given for the same field. However, since the reference signal REF and the vertical sync signal SVD have not been phase-locked, the field to be written can be inverted after a certain time elapses. This phenomenon occurs only once several minutes so that it can be almost neglected visually.

Only one problem is the state where the edges of the reference signal REF and the vertical sync signal SVD are very close to each other and remain almost unchanged. In this state, the field to be written will be changed frequently due to a minute phase difference between the edges and so fluctuations of the entire small pictures in the vertical direction may be recognized visually. This phenomenon can be obviated by change-over from one of previously prepared two reference sync signals having a phase difference therebetween to the other when the phase difference between the one reference sync signal and the vertical sync signal SVD has become small.

Figure 5:
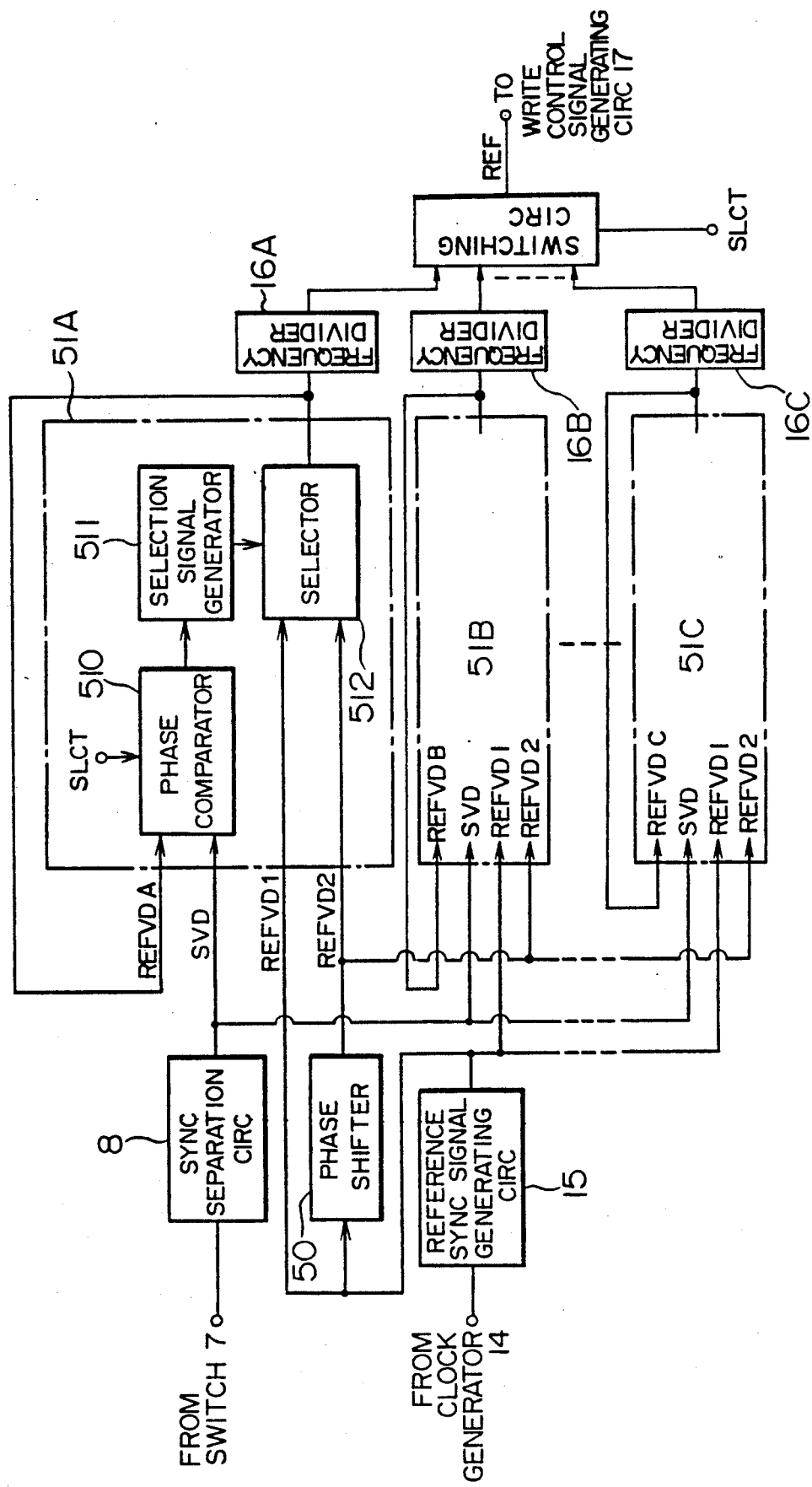
FIG. 5 is a block diagram of another embodiment of the present invention.

FIG. 5 is a block diagram of an exemplary arrangement of a reference sync signal REFVD generating circuit constructed on the basis of the above technical conception.

The reference sync signal generating circuit 15 generates a reference sync signal REFVD1 (first refrence sync signal) having a period identical with that of the sync signal of a video signal defined in accordance with a certain standard as mentioned above. A part of the signal REFVD1 is supplied to a phase shifter 50 which in turn generates a second reference sync signal REFVD2 180° phase-shifted from the first reference sync signal REFVD1. In order to control the write of video signals which provide information for small pictures, selecting circuits 51A, 51B, 51C, ... for selecting the first or the second reference sync signal are provided for respective displaying signal sources of the video signals.

Each selecting circuit is provided with a phase comparator 510, a selection signal generator 511 and a selector 512. The phase comparator 510 phase-compares the vertical sync signal SVD sent from the sync separation circuit 8 with the reference sync signal REFVDA (REFVDB, ... or REFVDC) having been selected and generates a co-incidence detection signal when at least parts of both signals appear simultaneously. The selection signal generator 511 generates a selection signal in response to the coincidence detection signal. The selector 512 receives the first reference sync signal REFVD1 and the second reference sync signal REFVD2, which is 180° out of phase with respect to the signal REFVD1, from the reference sync signal generating circuit 15 and the phase shifter 50, respectively, and selects one of the first and the second sync signals in accordance with the selection signal supplied from the selection signal generator 511.

The reference sync signals REFVDA, REFVDB, . . . , REFVDC sent out from the selectors 512 of the selecting circuis 51A, 51B, ... are supplied to a switching circuit 52 through respective frequency dividers 16A, 16B, ... , 16C, where the frequencies of the reference sync signals are decreased to one-half the inputted reference sync signal to provide respective reference signals. The switching circuit 52 sequentially and periodically delivers the received reference signals one by one to the write control signal generating circuit 17 as a reference signal REF under the control of, e.g., a channel change-over signal SLCT formed from the control signal. A part of each of the reference sync signals REFVDA, REFVDB, ... , REFVDC constitutes one input to the phase comparator 510 of each selecting circuit. The SLCT signal supplied to the phase comparator 510 serves as a reset signal.

An exemplary specific circuit arangement of the selection circuit 51 will be explained with reference to FIGS. 6A and 6B.

Figure 6A:
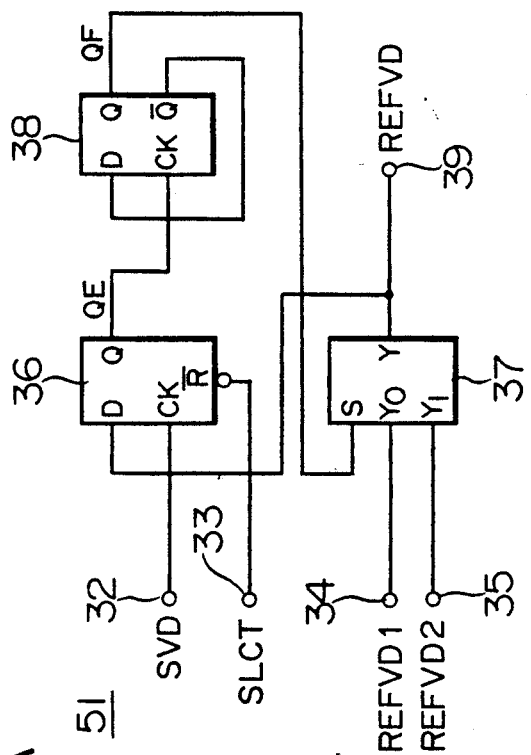
FIG. 6A is a diagram of one example of a specific circuit in the embodiment of FIG. 5.
Figure 6B:
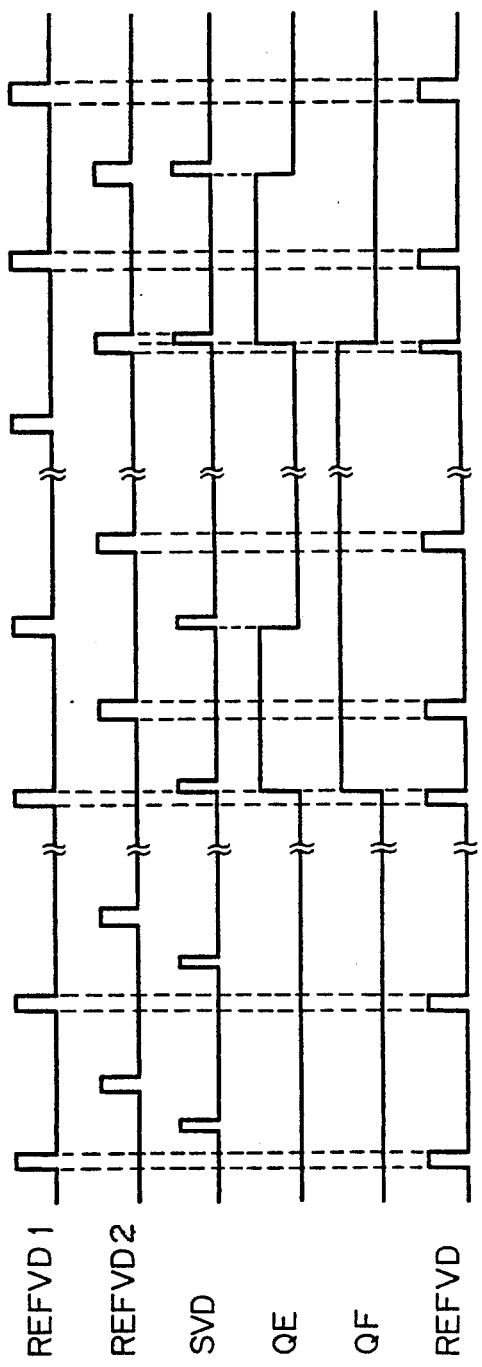
FIG. 6B is a timing chart showing the operation of the embodiment of FIG. 6A.

In FIG. 6A, 32 denotes a vertical sync signal input terminal; 33 an input terminal for a picture change-over control signal; 34 an input terminal for the first reference sync signal REFVD1; 35 an input terminal for the second reference sync signal REFVD2; 36, 38 flip-flops; 37 a selector; and 39 an output terminal for the reference sync signals. Incidentally, the circuit of FIG. 6A must be prepared in accordance with the number of small pictures to be displayed. In this embodiment, three such circuits, the outputs of which are switched by the switching circuit 52 (FIG. 5), are provided.

The operation of the selecting circuit will be explained with reference to FIGS. 6A and 6B.

The first reference sync signal REFVD1 and the second reference sync signal REFVD2 are two kinds of pulses 180° out of phase from each other, which are formed by frequency dividing the same clock signal. These two kinds of pulses are supplied to $Y_0$ and $Y_1$ terminals of the selector 37, and one of them is selected so as to be outputted from the reference sync signal output terminal 39. An S terminal of the selector 37 is a switching signal input terminal. When this terminal S is "Low", the terminal $Y_0$ is selected and when the terminal S is "High", the terminal $Y_1$ is selected. Assuming that the QF terminal of the flip-flop 38 is initially "Low", as seen from FIG. 6B, the first reference sync signal REFVD1 has been selected. The vertical sync signal SVD approaches the first reference sync signal REFVD1 with the lapse of time. When the rising edge of the vertical sync signal falls in the High period of the reference sync signal REFVD1, QE becomes "High" and also QF is inverted to be "High". Then, the output of the selector 37 is changed from the first reference sync signal REFVD1 into the second reference sync signal REFVD2. Thus, clearance of a 180° phase difference occurs between the reference sync signal REFVD and the vertical sync signal SVD.

In this way, a malfunction such that the field to be written changes frequently as mentioned above does not occur. When the phase difference between the second reference sync signal REFVD2 and the vertical sync signal disappears with a further lapse of time, the first reference sync signal REFVD1 is selected again through the operation reverse to the above operation. Through the above process, malfunctions can be prevented.

It should be noted that this selecting circuit is intermittently operated since a plurality of such circuits are actually provided. More specifically, the plurality of the selecting circuits are provided correspondingly to the respective small pictures, and when the picture change-over signal SLCT is applied for rewrite of the picture, one of the selecting circuits is selected. The picture change-over signal SLCT, which is supplied through the input terminal 33, is "High" when the selecting circuit has been selected, whereas it is "Low" when the selecting circuit has not been selected whereby the output QE of the flip-flop 36 will not be inverted.

From the above explanation, it should be understood that the rewrite of the memory can be always carried out for the same odd-numbered or even-numbered field without performing the field discrimination on the basis of detection of a phase difference between a vertical sync signal and a horizontal sync signal.

Figure 7:
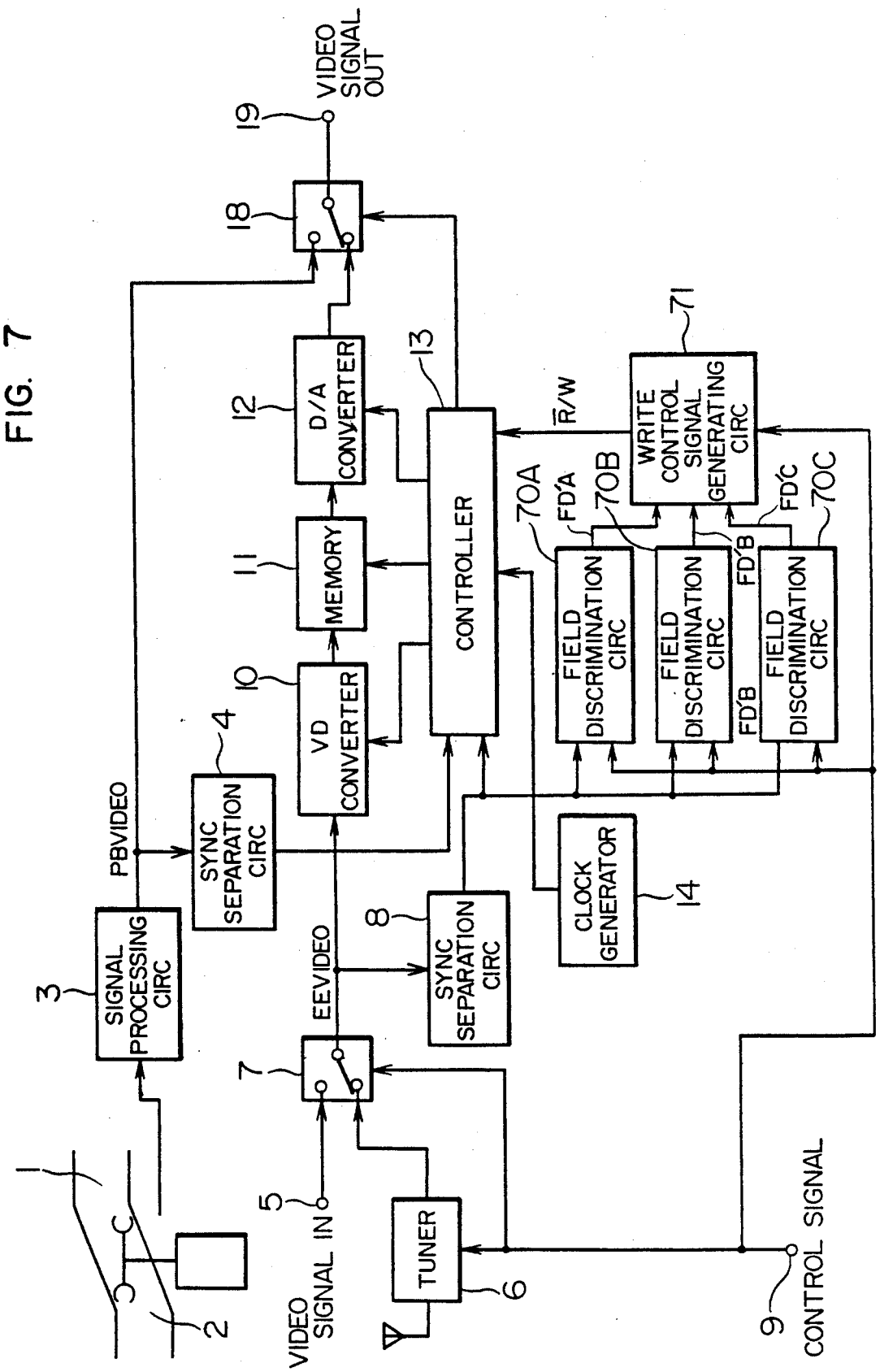
FIG. 7 is a block diagram of another embodiment of the present invention.

Explanation will be given for an embodiment of the present invention in which the field discrimination on the basis of detection of the phase difference between both sync signals and also the time-divisional exchange of the tuner can be implemented. FIG. 7 is a block diagram of this embodiment. In FIG. 7, 70A, 70B and 70C are field discrimination circuits. The other components refer to like components in FIG. 1. This embodiment is characterized by provision of field discrimination circuits corresponding to the number of small pictures. In FIG. 7, three field discrimination circuits are provided for the case where three small pictures are displayed as shown in FIG. 2.

The operation of this embodiment will be explained. The field discrimination circuits 70A, 70B and 70C carry out the field discrimination of ODD and EVEN using the horizontal and vertical sync signals separated from the external video signal EEVIDEO. Although the field discrimination is carried out using the phase relation between the vertical sync signal and the horizontal sync signal, as mentioned relatively to the embodiment of FIG. 1, in order to prevent malfunction or erroneous operation due to noise, the discrimination circuit does not provide an immediate response even if the discrimination result is changed. Specifically, the discrimination circuit operates to exchange the discrimination output only when the discrimination results counted by a counter are successively changed by a predetermined number of counts (corresponding to, e.g., seven fields). Three such circuits provided in this embodiment operate in response to the control signals for change-over between the corresponding pictures. Each discrimination circuit carries out the above field discrimination operation if it has been selected, whereas is stops the operation to hold the number of counts in the counter, the discrimination results, etc., as they are if the discrimination circuit has not been selected. In this way, even if the tuner is time-divisionally employed, stabilized field discrimination results can be obtained swiftly. Therefore, the rewrite of the memory can always be carried out for the video signal belonging to the same odd-numbered or even-numbered field.

Figure 8A:
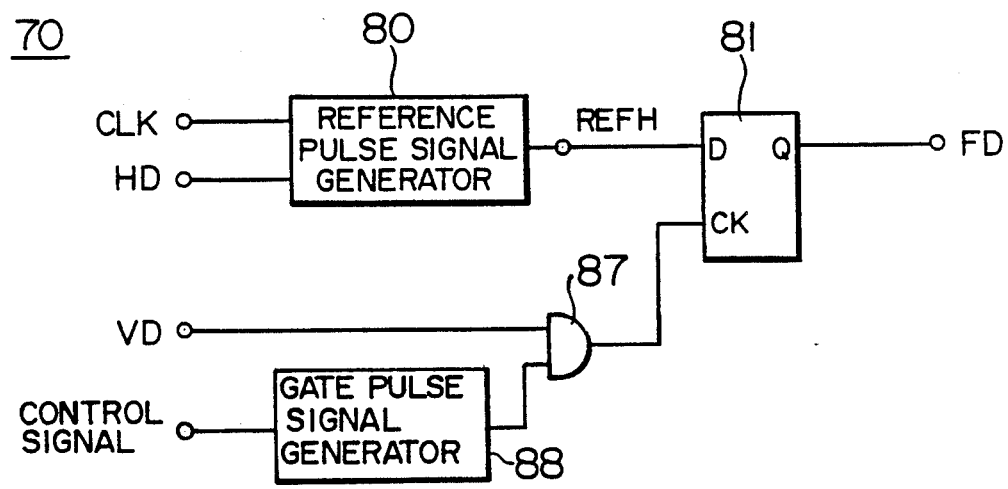
FIG. 8A is a block diagram of still another embodiment of the present invention.
Figure 8B:
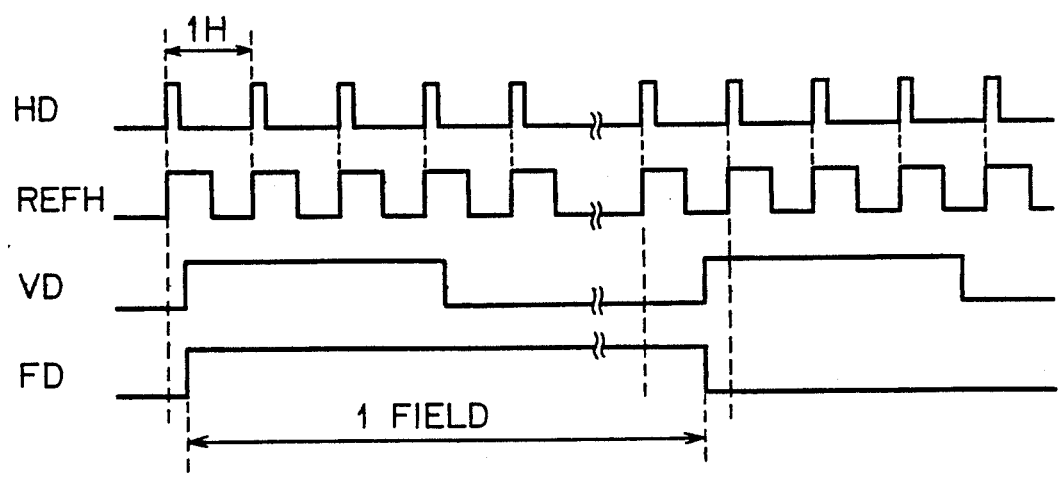
FIG. 8B is a timing chart showing the operation of the embodiment of FIG. 8A.

An exemplary arrangement of the field discrimination circuit 70 will be explained with reference to FIGS. 8A and 8B. FIG. 8A shows a typical arrangement of the field discrimination circuit and FIG. 8B shows the operation thereof in a timing chart. A reference pulse generating circuit 80, which may be constituted by a counter, counts clock pulses CLK and is reset by a horizontal sync signal HD supplied from the sync separation circuit 8 (FIG. 7). By pre-setting a value corresponding to the number of pulses supplied for one-half of 1 H time period, the reference pulse generating circuit 80 generates (½)H pulses REFH which are "High" only during a (½)H period. The (½)H pulses are supplied to the D terminal of a flip-flop 81 (FF1) and are sampled using the vertical sync signal VD supplied from the sync separation circuit 8. The edge of the signal VD is subjected to a time delay when it is separated from a composite TV signal, the delay time being previously set so that the edges of the VD signal are located substantially centrally in the respective "High" and "Low" durations of the (½)H pulses. Thus, the phase relation between the signals VD and HD is displaced by about (½)H for each one field so that the discrimination output is changed from "High" to "Low" (or vice versa) for each one field. An AND gate 87 is provided for gating the signal VD with a gate signal generated from the control signal and supplied by a gate pulse signal generator 88. The gate signal assumes a high level only when the field discrimination circuit under consideration is selected and active.

The field discrimination can be basically carried out in this arrangement. In case, however, the signals HD and VD are partially missing or carry noise, the operation of the discrimination output may not be satisfactory.

FIG. 9 shows an arrangement of the field discrimination circuit which is capable of preventing an erroneous operation due to noise. In FIG. 9, the (½)H pulse generating circuit 80 and flip-flop 81 (FF1) operate in the same manner as the corresponding components in FIG. 8A. A flip-flop 83 (FF2), which reduces the frequency of the separated vertical sync signal to ½ thereof, provides a discrimination output. The outputs from FF1 and FF2 are compared in a comparator circuit 84 in order to detect whether or not they have the same polarity. If they have different poralities, a reset signal which is generated through a gate circuit 86 inverts the polarity of the output from FF2 to the same polarity as that of FF1. The gate circuit 86 serves to generate the reset signal only when the count value in a counter 85 reaches a predetermined value. Therefore, in order that the polarity of the output from FF2 is inverted, the outputs from FF1 and FF2 must successively have different polarities so that the gate circuit 86 does not respond to signal noise. If the count value is set for a relatively large value, the discrimination circuit 70 is resistant to the erroneous operation to that degree but requires a long time for discrimination to that degree. As in FIG. 8A, the AND gate 87 is provided for gating the signal VD with a gate signal produced from the control signal. The gate signal assumes a high level only when the field discrimination circuit under consideration is selected and active. Thus, when the discrimination circuit is not selected, the signal VD is no longer supplied with the count value of the counter 85 with the discrimination result-output being maintained as they are. A timing signal generator 82, which generates timing pulses required for the above reset and comparison, may be constituted by a counter which is reset by the signal VD and counts the separated horizontal sync signal HD.

Figure 10A:
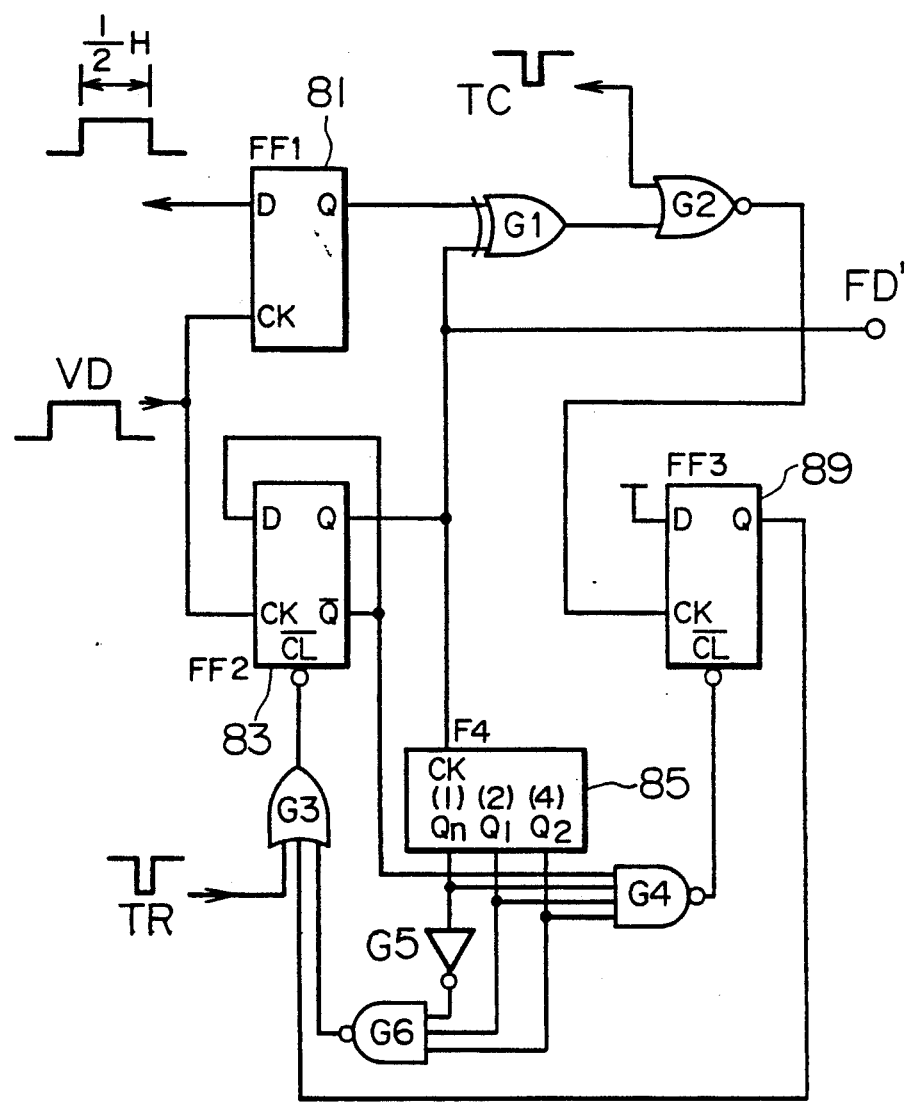
FIG. 10A is a diagram of one example of a specific circuit in the embodiment of FIG. 9.
Figure 10B:
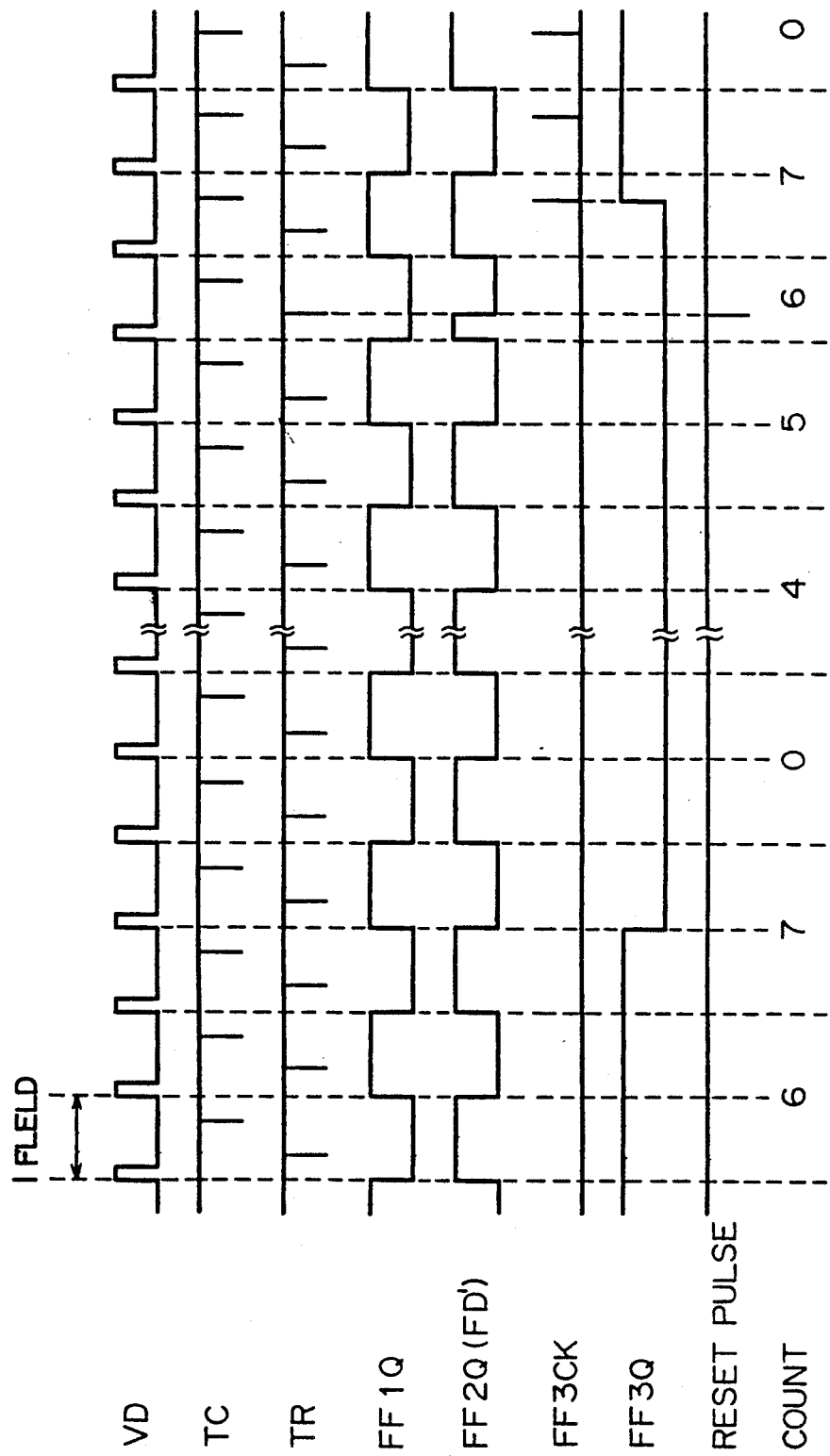
FIG. 10B is a timing chart showing the operation of the embodiment of FIG. 10A.

An exemplary arrangement of the field discrimination circuit is shown in FIG. 10A and the timing chart of the operation thereof is shown in FIG. 10B. In FIG. 10A, the timing signal generating circuit 82 (the construction of which is not shown since it can be easily constructed using a counter) generates timing signals TC and TR for the comparison and the resetting as shown in FIG. 10B. The counter 85, which is a 3-bit counter, serves to count circulatively 0 to 7.

In operation, if the outputs from the flip-flops 81, 83 (FF1 and FF2) are coincident with each other, an exclusive OR gage $G_1$ provides a "Low" output so that a pulse is supplied to CK terminal of a flip-flop 89 (FF3) and hence the output of FF3 is fixed to "High". Thus, the output of an OR gate $G_3$ is also fixed to "High" so that FF2 continues ½ frequency division. When the count value of the counter 85 reaches "7", FF3 is cleared and its output becomes "Low". However, if the clear is canceled, the output immediately returns to "High" so that a reset signal is not generated (since the reset signal is adapted to be generated when the count value is "6").

On the other hand, if the outputs from FF1 and FF2 have different polarities, the operation as shown in FIG. 10B is carried out. The output from the exculsive OR gate $G_1$ is "High" so that the CK input of FF3 is fixed to "Low". When the count value reaches "7", FF3 is reset so that its output is fixed to "Low". When the count value reaches "6" in this state, the OR gate $G_3$ is opened to produce a reset signal whereby the polarity of the output from FF2 is inverted. Thus, the outputs from FF1 and FF2 coincide with each other so that a pulse is supplied to CK terminal of FF3 and hence the output from FF3 is fixed to "High". In this way, the discrimination circuit of FIG. 10A can successfully carry out the field discrimination.

Figure 11:
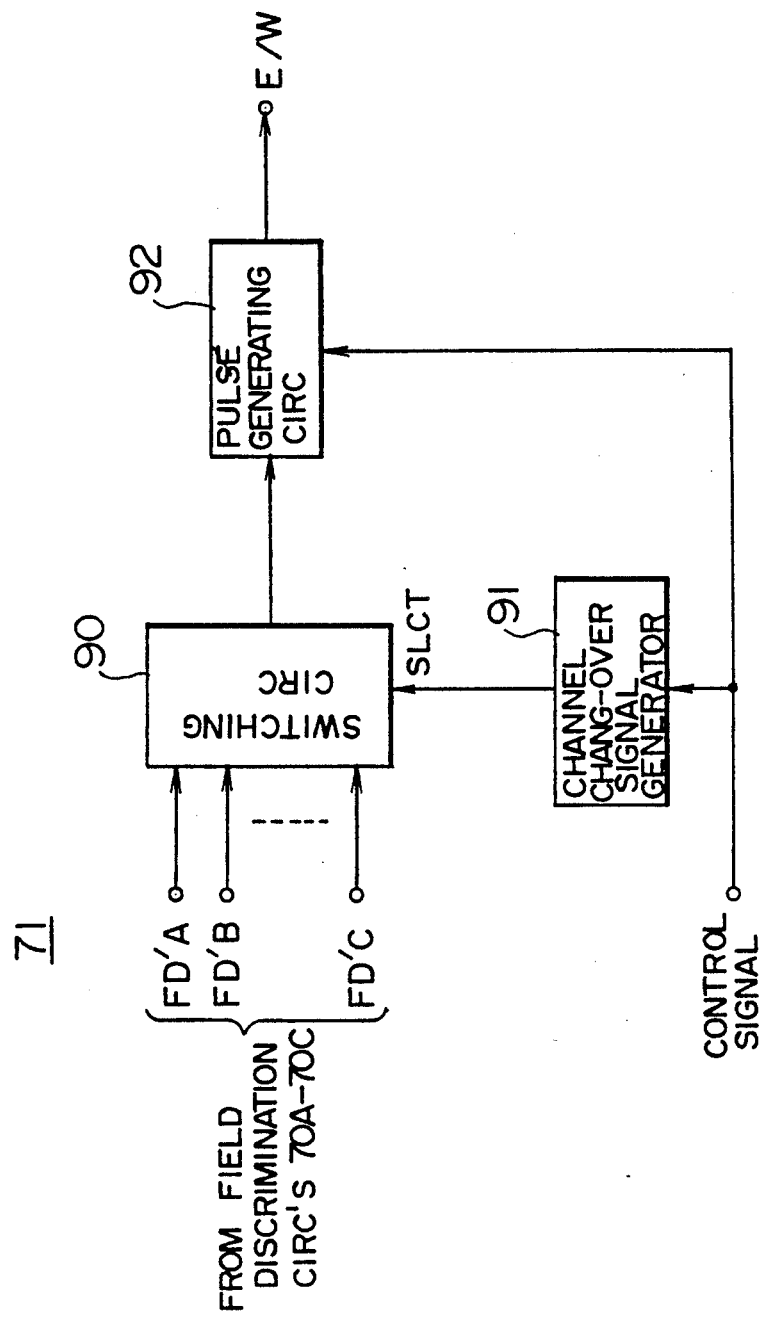
FIG. 11 is a block diagram of another embodiment of the present invention.

Referring now to FIG. 11 showing a structure of the write control signal generatig circuit 71, the field discrimination outputs FD'A, FD'B, ..., FD'C of the field discrimination circuits 70A, 70B, ..., 70C are supplied to a switching circuit 90, which selects the field discrimination signals FD'A, FD'B, ..., FD'C one by one sequentially under control of a channel change-over signal SLCT generated by a channel change-over signal generator 91 on the basis of the control signal. The selected field discrimination signal is then supplied to a pulse generating circuit 92 which serves to generate a write control signal $\overline{R}/W$ from the selected field discrimination signal (having a waveform such as FD' shown in FIG. 10B) under control of the control signal. The write control signal $\overline{R/W}$ may have a waveform similar to that of the write control signal $\overline{R/W}$ shown in FIG. 4B and is for always storing odd-numbered fields or for always storing even-numbered fields in the memory. The pulse generating circuit 92 may have a structure substantially identical with that shown in FIG. 4A. Namely, the output of the switching circuit 90 may be supplied to the terminal 23 of the structure shown in FIG. 4A so that a write control signal is provided at the output terminal 31.

I claim:

1. An apparatus for producing a signal for controlling storage of a plurality of video signals from different display signal sources in a memory, the order of storage of said video signals of different display signal sources being determined by a switching control signal, each of said video signals having a vertical sync signal, the apparatus comprising:
   means for separating the vertical sync signal from each of said video signals, each of said vertical sync signals having pulses recurrent with a predetermined repetition period;
   means for generating a reference signal having pulses recurrent with a period twice said predetermined repetition period of said vertical sync signals and assuming a relatively high level and a relatively low level alternately with a duty factor of 50%;
   means connected with said sync signal separating means and with said reference signal generating means for phase comparing said separated vertical sync signals with said reference signal to determine pulses in said vertical sync signals which assume either a relatively high level when said reference signal assumes a relatively high level or a relatively low level when said reference signal assumes a relatively low level; and
   means connected with said phase comparing and determining means for generating a write enable signal having pulses each rising with a different one of said determined pulses in said vertical sync signals and lasting for a duration identical with said predetermined repetition period of said vertical sync signals.

2. An apparatus according to claim 1, wherein said reference signal generating means includes a reference signal source for generating a pulse signal having a repetition period identical with said predetermined repetition period of said vertical sync signals and a frequency divider for reducing the frequency of said pulse signal delivered from said reference signal source to one-half of said frequency of said pulse signal.

3. An apparatus according to claim 1, wherein said reference signal generating means includes:
   a reference signal source for generating a first pulse signal having a repetition period identical with said predetermined repetition period of said vertical sync signals;
   a phase shifter for phase shifting said first pulse signal to produce a second pulse signal out of phase with respect to said first pulse signal;
   a plurality of selecting circuits, one provided for each of said display signal sources, connected to receive said first and second pulse signals and serving to select one of them;
   a switching circuit for receiving outputs of said plurality of selecting circuits and sequentially and periodically delivering outputs of said selecting circuits one by one depending on said switching control signal, each of said selecting circuits including a phase comparator for phase comparing said selected pulse signal sequentially and periodically delivered by said switching circuit and said separated vertical sync signal and generating a coincidence detection signal when at least parts of said selected pulse signal and said separated vertical sync signal appear simultaneously, a selection signal generator responsive to said coincidence detection signal for generating a selection signal and a selector for receiving said first and second pulse signals from said reference signal source and said phase shifter, respectively, said selector being responsive to said selection signal for said selection of one of said first and second pulse signals and supplying the selected pulse signal to said switching circuit; and
   a frequency divider for reducing the frequency of said selected pulse signal sequentially and periodically selected and delivered from said switching circuit to one-half of said frequency of said pulse signal.

4. An image signal processing apparatus for producing a combined picture video signal from which a large picture and at least one small picture being inset in the large picture are simultaneously reproduced on a display screen, the apparatus comprising:
   a signal processing circuit for processing a video signal delivered from a first display signal source to provide a first analog video signal adapted for display, said first analog signal providing image information for said large picture and having a first vertical sync signal;
   means for separating the first vertical sync signal from said first analog video signal;
   an A/D converter arranged to receive a second analog video signal from at least one second display signal source for converting said second analog video signal to a corresponding digital video signal, said second analog video signal providing image information for said small picture and having a second vertical sync signal;
   memory means for storing therein said digital video signal;
   a D/A converter arranged to receive a digital video signal read out from said memory means for converting said received digital video signal to a corresponding analog video signal for display;
   means for separating the second vertical sync signal from said second analog video signal, said second vertical sync signal having pulses recurrent with a predetermined repetition period;
   means for generating a reference signal having pulses recurrent with a period twice said predetermined repetition period of said second vertical sync signal and assuming a relatively high level and a relatively low level alternately with a duty factor of 50%;
   means connected with said second sync signal separating means and with said reference signal generating means for phase comparing said separated second vertical sync signal with said reference signal to determine pulses in said second vertical sync signal which assume either a relatively high level when said reference signal assumes a relatively high level or a relatively low level when said reference signal assumes a relatively low level; and means connected with said phase comparing and determining means for generating a write enable signal having pulses each rising with a different one of said determined pulses in said second vertical sync signal and lasting for a duration identical with said predetermined repetition period of said second vertical sync signal; and control means for controlling operations of said A/D converter, said memory means and said D/A converter on the basis of said first and second vertical sync signals and said write enable signal.

5. An apparatus for producing a signal for controlling storage of a plurality of video signals of different display signal sources in a memory, the order of storage of said video signals of different display signal sources being determined by a switching control signal, each of said video signals having horizontal and vertical sync signals, the apparatus comprising:

means for separating horizontal and vertical sync signals from each of said video signals, said horizontal and vertical sync signals having pulses recurrent with first and second predetermined repetition periods, respectively;

a plurality of field discrimination circuits connected with said sync signal separating means, one provided for each of said display sources, each of said field discrimination circuits including means responsive to said separated horizontal sync signal for generating a reference pulse signal having pulses recurrent with the same period as said first predetermined repetition period of said horizontal sync signals and assuming a relatively high level and a relatively low level alternately with a duty factor of 50%, and means connected with said sync signal separating means and with said reference pulse signal generating means for phase comparing said separated vertical sync signals with said reference pulse signal and generating a discrimination signal representative of whether each of said pulses in said vertical sync signal is for an odd-numbered field or an even-numbered field;

a selecting circuit for receiving the discrimination signals from said field discrimination circuits and delivering said field discrimination signals sequentially and periodically one by one in accordance with said switching control signal; and means connected with said selecting circuit for generating a write enable signal from an output of said selecting circuit.

6. An image signal processing apparatus for producing a combined picture video signal from which a large picture and at least one small picture being inset in the large picture are simultaneously reproduced on a display screen, the apparatus comprising:

a signal processing circuit for processing a video signal delivered from a first display signal source to a first analog video signal adapted for display, said first analog signal providing image information for said large picture and having a vertical sync signal;

means for separating the vertical sync signal from said first analog video signal;

an A/D converter arranged to receive a second analog video signal from at least one second display signal source for converting it to a corresponding digital video signal, said second analog video signal providing image information for said small picture and having horizontal and vertical sync signals;

memory means for storing therein said digital video signal;

a D/A converter arranged to receive a digital video signal read out from said memory means for converting it to a corresponding analog video signal for display;

means for separating the horizontal and vertical sync signals from said second analog video signal, said horizontal and vertical sync signals separated from said second analog video signal having pulses recurrent with predetermined first and second repetition periods, respectively;

a plurality of field discrimination circuits connected with said horizontal and vertical sync signal separating means, one provided for each of said display sources, each of said field discrimination circuits including means responsive to said separated horizontal sync signal for generating a reference pulse signal having the same period as said first predetermined repetition period of said horizontal sync signals and assuming a relatively high level and a relatively low level alternately with a duty factor of 50%, and means connected with said horizontal and vertical sync signal separating means and with said reference pulse signal generating means for phase comparing said vertical sync signals separated from said second analog video signal with said reference pulse signal and generating a discrimination signal representative of whether each of said pulses in said vertical sync signals separated from said second analog video signal is for an odd-numbered field or an even-numbered field;

a selecting circuit for receiving the discrimination signals from said field discrimination circuits and delivering said field discrimination signals sequentially and periodically one by one in accordance with said switching control signal;

means connected with said selecting circuit for generating a write enable signal from an output of said selecting circuit; and control means for controlling operations of said A/D converter, said memory means and said D/A converter on the basis of said vertical sync signals separated from said first and second analog video signals and said write enable signal.

* * * * *